2 Sheets—Sheet 1.

J. P. DELAHUNTY, Sr.

DYE VAT.

No. 10,973. Reissued Dec. 11, 1888.

Witnesses:
Henry Denny
E. M. Rieckinnes

Inventor:
Joseph P. Delahunty
by his Atty
S. Thackwell

N. PETERS, Photo-Lithographer, Washington, D. C.

2 Sheets—Sheet 2.

J. P. DELAHUNTY, Sr.

DYE VAT.

No. 10,973. Reissued Dec. 11, 1888.

Witnesses:
Henry Drury
C. H. Burchmeed

Inventor:
Joseph P. Delahunty Sr.
By his atty
[illegible]

N. PETERS, Photo-Lithographer, Washington, D. C.

UNITED STATES PATENT OFFICE.

JOSEPH P. DELAHUNTY, SR., OF PITTSTON, PENNSYLVANIA.

DYE-VAT.

SPECIFICATION forming part of Reissued Letters Patent No. 10,973, dated December 11, 1888.

Original No. 305,155, dated September 16, 1884. Application for reissue filed September 27, 1888. Serial No. 286,613.

*To all whom it may concern:*

Be it known that I, JOSEPH P. DELAHUNTY, Sr., a citizen of the United States, residing at Pittston, in the county of Luzerne and State of Pennsylvania, have invented a new and useful Improvement in Dye-Vats, of which the following is a full, clear, and exact description, due reference being had to the drawings which accompany and form a part of this application.

My invention has reference to processes and apparatus for dyeing; and it consists in causing the garments to be dyed to be passed through the dye, then raised clear of it, and dropped in succession, whereby said garments are kept separated from each other during their passage through the dye; further, in a large revolving cage formed of slats or their equivalent, provided on the interior with a series of pins projecting from the periphery toward the axis of the wheel, the said cage being supported in a tank of dyeing-liquid in such manner that it is part in and part out; and in details of construction, all of which are fully set forth on the following specification and shown in the accompanying drawings, which form part thereof.

Heretofore it has been customary in dyeing finished goods—as underwear, &c.—to place them in a large vat or tank containing the dyeing-liquid and pole them by hand—that is to say, catch them on the end of poles and drag them through the dyeing-liquid. In practice it is found that the poling is uncertain, and some goods are treated more uniformly than others, while in some cases the garments lie unseen or unfelt in a corner of the tank and become ruined. The uneven poling causes the goods to be dyed various shades or tints, and when they get twisted or knotted the dye cannot penetrate, and the dyeing becomes streaky. These defectively-dyed goods, though otherwise perfect, cannot be sold without a heavy loss.

The object of my invention is therefore to overcome all of the above objectionable features by the adoption of mechanical means in place of hand-labor, and so forming the machine that all of the goods must be uniformly handled and dyed.

Figure 1:
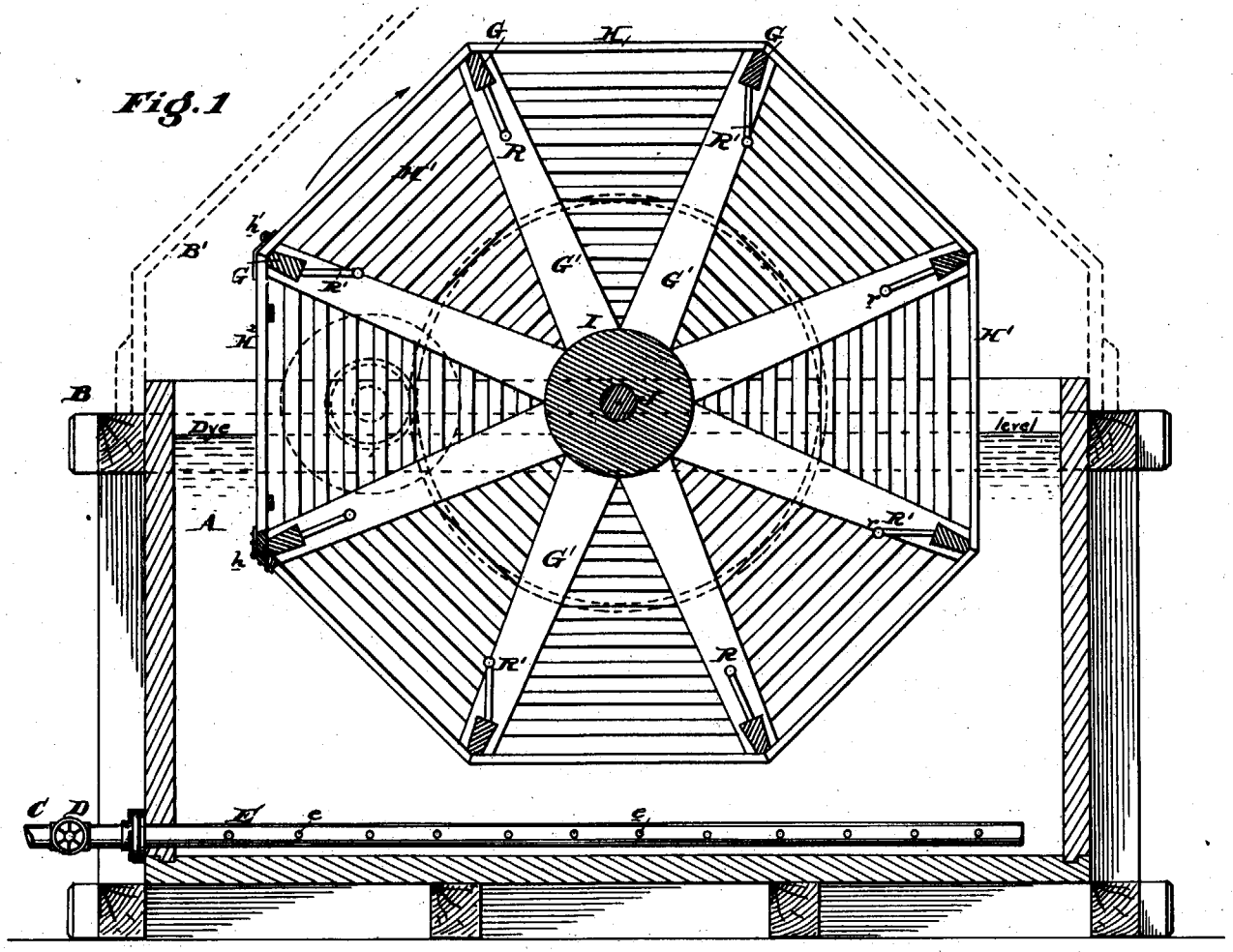
Figure 2:
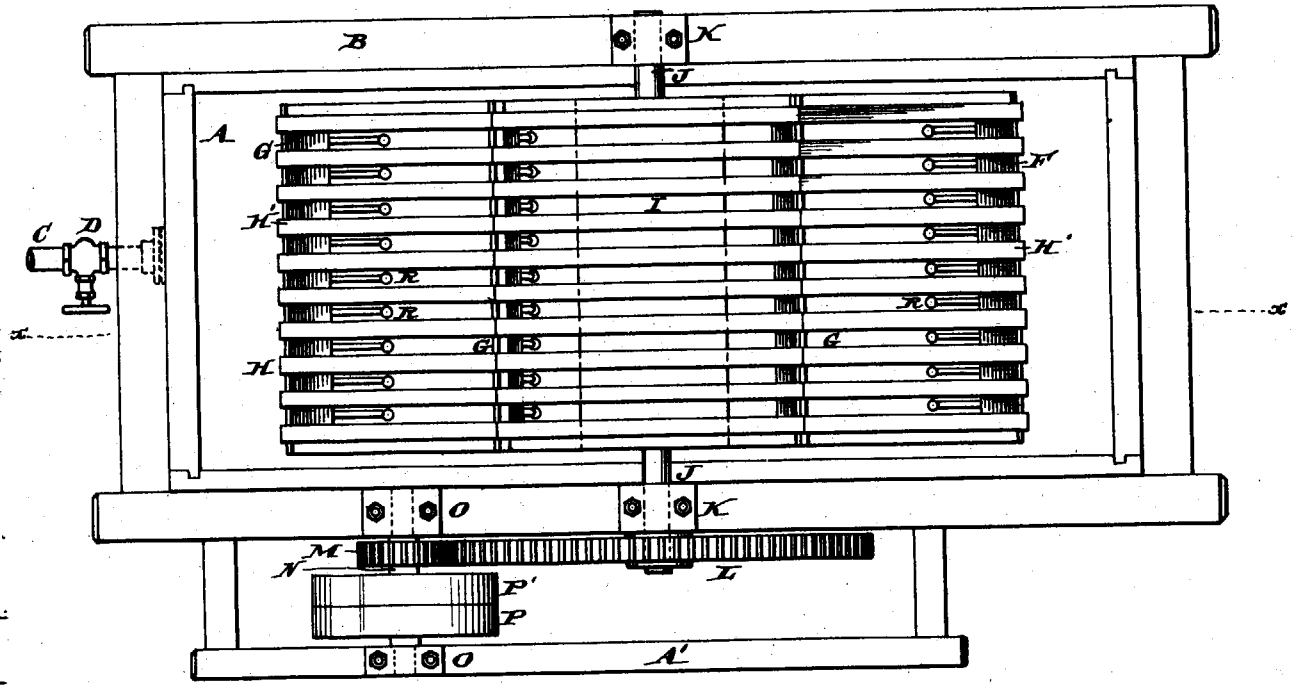

In the drawings, Figure 1 is a sectional elevation of my improved dyeing-machine on line *x x* of Fig. 2, and Fig. 2 is a plan view of same.

A is the dye-tank, and is supported within the frame B.

C is a steam-pipe, which connects with the heating-pipe E, extending through the tank A, close to its floor, and provided with apertures *e*, to distribute the steam, the supply of which may be regulated by a valve, D.

H is the dyeing-cage, which consists of the roller I, secured to the shaft J, from which radiate at each end the spokes G′, which carry the circumferential ribs G, making the wheel octagonal, and all of its faces are covered with open slat-work H′, or other open-work, leaving large spaces, through which the liquid-dye passes. One of the sides or faces upon the circumference of the wheel or cage is formed into a door, $H^2$, hinged at *h*, and provided with a catch or lock, *h′*, through which the goods to be dyed may be inserted or removed. If desired, the wheel or cage H may be made cylindrical and formed of wood or a metal not acted on by the dye, as bronze. The ribs G are each provided with a series of pins, R or R′, the former of which radiate toward the axis of the cage, while the latter are set obliquely, pointing in the direction of the rotation of the wheel. These pins pick up the garments and carry them up, the radial pins dropping them at or before the time they reach a vertical line through the axis of the wheel, while the oblique pins do not drop them until they are past the said vertical line, the object of which is to allow the goods to pass as freely through the dyeing-liquid as possible and not become tangled. The roller I in the center of the cage prevents the goods hanging or twisting on the shaft J, and when said goods fall upon said roller it feeds them off gently into the tank. If desired, this roller I may be dispensed with.

If desired, all of the pins may be set obliquely, or alternately radial and oblique, in a single series, or the angle may increase with each series, as I do not confine myself to their specific arrangement. These pins may be made of a short rod with or without a head, *r*.

The dye in the tank extends up close to the axis of the cage H, as shown, and, if desired, when working, the tank and wheel may be covered with a removable cover, B′.

The shaft J is supported in bearings K, and has upon one of its ends a spur-wheel, L, which meshes with a pinion, M, secured to a shaft, N, journaled in boxes O O, and carrying fast and loose pulleys P P′. The outer box, O, is supported by a frame, A′, secured to the main frame B.

The cage H is revolved slowly, from five to six revolutions being sufficient; but the speed may be increased or diminished, as desired.

While I prefer the construction shown, it may be modified in various ways without departing from my invention.

Having now described my invention, what I claim as new, and desire to secure by Letters Patent, is—

1. In a dyeing-machine, a dye-tank, in combination with a rotating wheel or cage formed of open-work to allow of the passage of the dye, said cage being provided with pins projecting from the periphery of the said cage inward, a roller or cylinder located about its axis, and supported partly in and partly out of the liquid dye, substantially as and for the purpose specified.

2. In a dyeing-machine, the dye vat or tank, in combination with a revolving cage partly submerged in the liquid dye, the said cage being formed of open-work to allow the passage of the dye, and provided with a large central cylinder, and pins projecting from the circumference obliquely inwardly, substantially as and for the purpose specified.

3. The combination of tank A, wheel or cage H, of open-work, having door $H^2$, and pins R and R′, shaft J, spur-wheel L, pinion M, shaft N, and drive-pulley P, substantially as and for the purpose specified.

4. The combination of tank A, wheel or cage H, of open-work, having door $H^2$, and pins R and R′, and cylinder I, shaft J, spur-wheel L, pinion M, shaft N, and drive-pulley P, substantially as and for the purpose specified.

5. In a dyeing-machine, a dye-vat, in combination with a large cylinder formed of open-work, supported partly in the dyeing-liquid and revolved slowly therein, and provided with two or more rows of pins projecting from the periphery inwardly, one or more of said rows of pins being arranged in lines radiating from the center, the remainder of said rows of pins being arranged obliquely thereto, to catch the garments floating in the dye, lift them up clear thereof, and drop them again into the dye, each successive garment, after being raised from the liquid, being dropped at a different point, so that no two garments fall into the dye at the same place at the same time, substantially as and for the purpose specified.

In testimony of which invention I hereunto set my hand.

JOSEPH P. DELAHUNTY, Sr.

Witnesses:
RICHD. S. CHILD, Jr.,
R. M. HUNTER.